United States Patent

[11] 3,583,752

| [72] | Inventor | Hugo A. Panissidi<br>Peekskill, N.Y. |
|---|---|---|
| [21] | Appl. No. | 694,958 |
| [22] | Filed | Jan. 2, 1968 |
| [45] | Patented | June 8, 1971 |
| [73] | Assignee | International Business Machines Corporation<br>Armonk, N.Y. |

[54] VIBRATORY ARTICLE HANDLING DEVICE
23 Claims, 3 Drawing Figs.

[52] U.S. Cl. .................................. 294/88,
198/218, 214/1, 294/86, 273/86
[51] Int. Cl. .................................................. B66c 1/00
[50] Field of Search ........................................... 294/86, 88,
86 LS; 198/33 R, 218; 214/1 RLM, 1 B3; 259/1;
273/86.5; 46/1 C

[56] References Cited
UNITED STATES PATENTS

| 1,217,145 | 2/1917 | Brenner.......................... | 273/86.5 |
| 3,084,967 | 4/1963 | Harrett.......................... | 294/86 |
| 3,196,580 | 7/1965 | Rakestraw...................... | 46/1C |
| 3,241,687 | 3/1966 | Orloff............................ | 214/1RLM |
| 3,251,483 | 5/1966 | Devol............................ | 214/1B3 |
| 3,272,347 | 9/1966 | Lemelson...................... | 214/1RLM |
| 2,940,582 | 6/1960 | Boros............................ | 198/218 |

Primary Examiner—Andres H. Nielsen
Attorneys—Hanifin and Clark and Graham S. Jones, II ABSTRACT: A removable manipulator gripper is adapted to grasp, twist in a simulated wrist action, and provide simultaneous transverse and longitudinal vibration in order to search for a desired location for insertion of the grasped article. The amplitude of search drive displacement is reduced to a minimum in response to loading of the gripper by insertion of the article. A pair of jaws is operated by a wedge cam. The jaws are pressed inwardly towards an anvil. The gripper is locked onto the shaft when pressure is applied to close the gripper jaws.

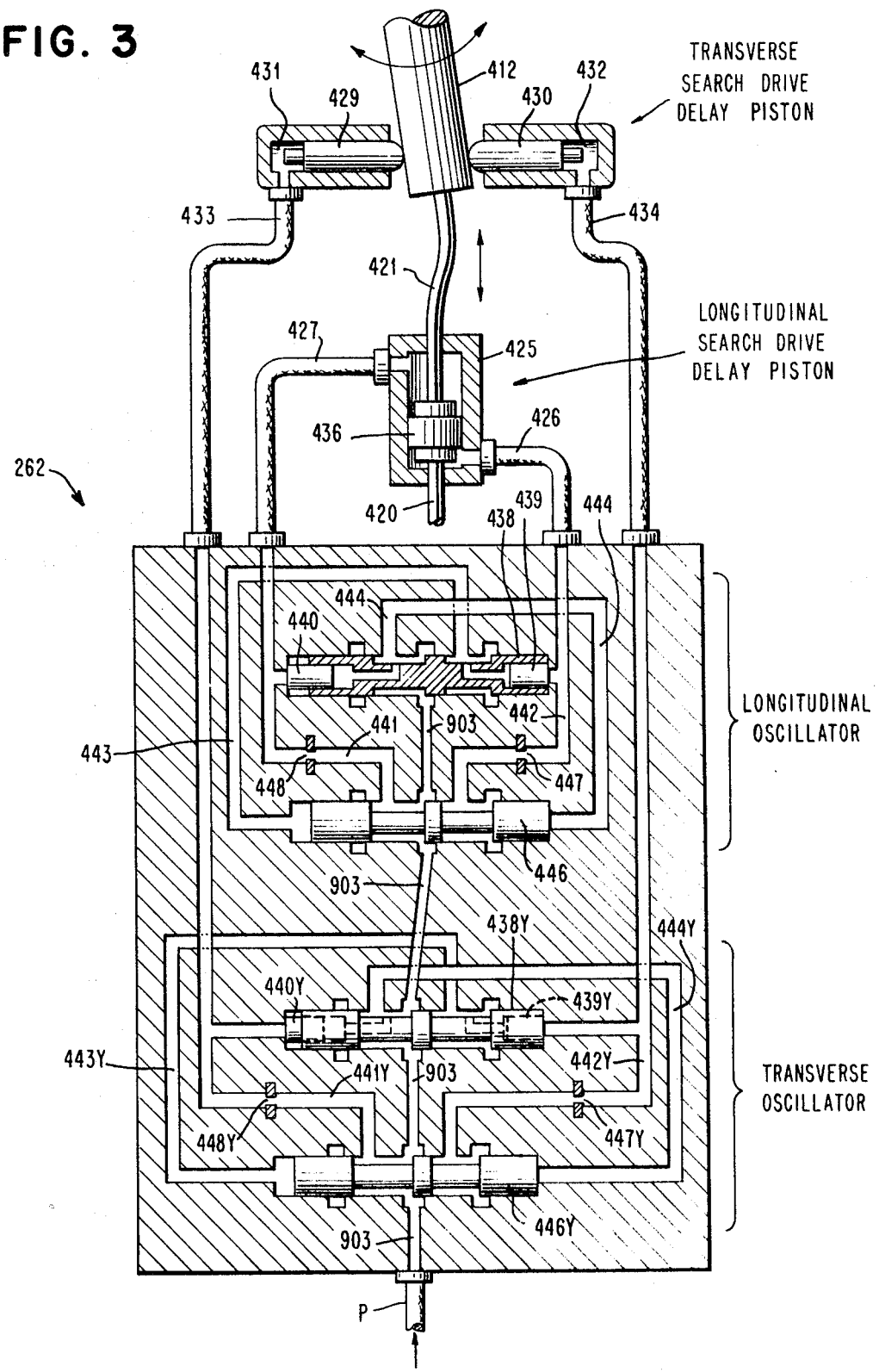

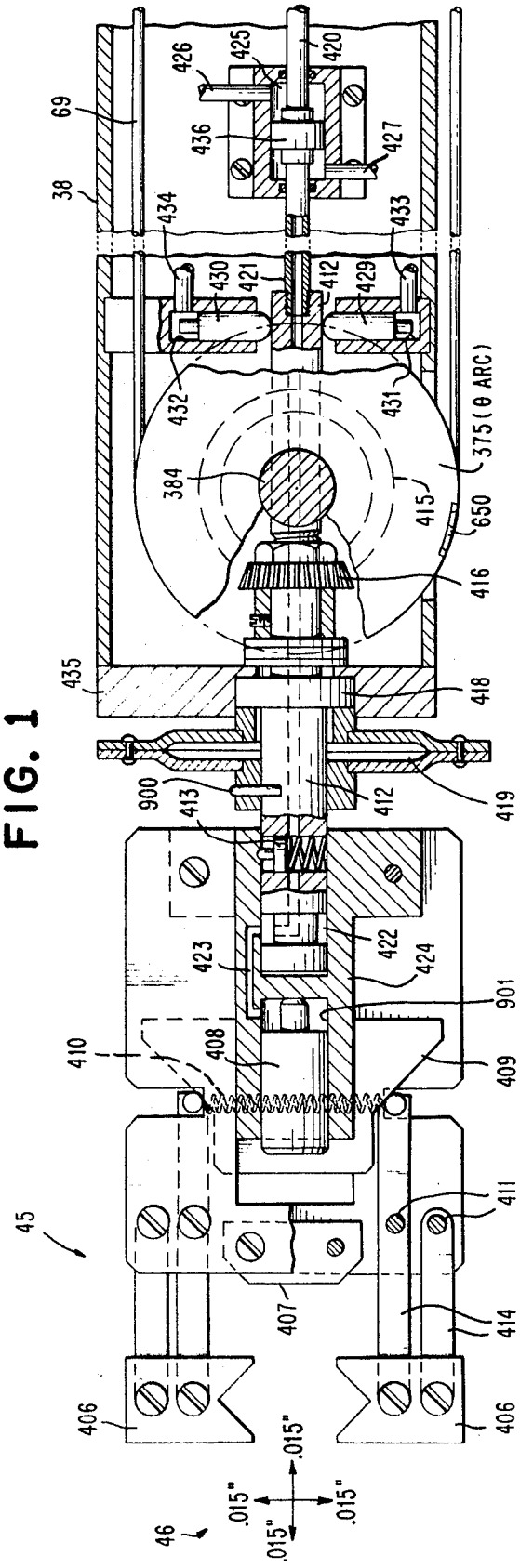

VIBRATORY ARTICLE HANDLING DEVICE

CROSS-REFERENCE TO RELATED APPLICATION

In a related copending application, Ser. No. 694,941, filed Jan. 2, 1968 on my behalf entitled "Manipulator," and assigned to the assignee hereof, there is set forth a manipulator and the controls therefor including a description of the subject matter of this invention.

BACKGROUND OF THE INVENTION

This invention relates to article handling equipment. More particularly this invention relates to means for vibrating article handling devices. In another aspect, this invention relates to grippers for article handling equipment.

Prior article handling devices have generally included remote control whereby an operator could correct error between the desired objective and the position of the article. The present invention is concerned with the problem of adjusting an article slightly removed from a desired location to a desired location without error detection and without resorting to directing movements through extremely small distances with great accuracy. For example, a screw held by an article handling device may be a thousandth of an inch from insertion into a tap in a part. It would be desirable to perform such an adjustment without using error-correcting devices or human supervision. Static friction between parts is a problem in assembly which damages and slows insertion of threaded elements. Accordingly, it is desirable to maintain slight motion of the parts subsequent to insertion.

Grippers having pivoted jaws are well known. Such jaws have the well-known tendency to fail to envelop a part to be grasped.

Accordingly, an object of this invention is to provide an improved article handling device.

Another object of this invention is to provide an article handling device employing vibratory motion to move articles through small distances.

Still another object is to provide a vibratory search means for an article handling device.

A further object is to provide such a vibratory search means moving at random.

An additional object is to provide a gripper having a novel structure.

A still further object is to provide a gripper providing three-point support for an article.

Yet another object is to provide a gripper having means for vibrating an article held in said gripper.

Another object is to provide a removable gripper which is automatically locked onto a shaft by actuation thereof.

Still a further object is to provide a novel mode of grasping articles.

Yet an additional object is to maintain motion of an article handling device at a reduced amplitude.

SUMMARY OF THE INVENTION

In accordance with this invention an article handling device having means for vibrating a part secured thereto into a desired position is provided. Further, in accordance with this invention a gripper provides three-point support for an article.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 is a partially sectional plan view of the gripper, showing the drive cable pulley, and bevel gear and their relationship as well as the gripper cam actuator and the vibrating search mechanism.

FIG. 2 is an elevation view of the inner portion of the gripper drive mechanism with an armplate wall partially broken away.

FIG. 3 is a schematic sectional view of the hydraulic circuit and output for the gripper vibrating search mechanism.

THE GRIPPER ASSEMBLY

The gripper 45, FIG. 1, comprises a pair of jaws 406, an anvil 407 and a gripper piston 408 held within a housing 424. The size and shape of such parts will depend upon the nature of the object to be picked up by the gripper.

The two jaws 406 are simultaneously closed when a wedge cam 409 is driven to the left by the hydraulic grip mode piston 408, because of the pivot pins 411 for the parallel arms 414 spanning between the wedge cam 409 and the outer grip jaws 406. The jaws 406 pivot toward the anvil 407 as they close providing a three-point support for holding objects having many shapes such as square, rectangular, triangular, other polygonal and round shapes. The anvil 407 may be as shown or may be modified to provide additional holding force by either magnetic or vacuum operated means. For relatively small objects the jaws 406 may be V-grooved as are conventional grippers to grasp round, polygonal or square objects. Then the anvil may not be necessary. A spring 410 attached to the right ends of the longer two parallel arms 414 tends to hold the ends of those arms against the cam surfaces of the wedge cam 409.

The gripper assembly 45 is secured to a manipulator arm 38 by means of a spring-loaded manipulator shaft 412 to be inserted in a cavity 422 in housing 424 and which also carries a spring-loaded detent piston 413 designed to be detented against a wall of the cavity 422. The shape of the detent piston 413 and the walls of the cavity 422 with which it engages, permits easy replacement of the gripper 45 on the manipulator shaft 412, provided the gripper piston 408 is not pressurized. The pressurization of the gripper piston 408 by tube 420 as described below also pressurizes the detent piston 413 with a force effective for locking the gripper to the manipulator shaft 412 wherever an object is to be picked up or transported by the manipulator. The automatic locking of the gripper 45 to the manipulator only when the gripper jaws 406 are engaged provides a simple means of exchanging gripper assemblies during a program of operation in which the objects to be handled require several different types of grippers.

The gripper shaft 412 and the gripper mounted on it are adapted to be rotated as much as 270° about the axis of the manipulator shaft 412. Such rotation is referred to as the $\theta$ mode of operation. The manipulator shaft 412 is turned by a drive cable 69 driven by means not shown and drawn around and attached by bar 650 to the pulley 375 journaled on the short shaft 384. When the gripper 45 is to be rotated, the drive cable 69 is effective to rotate pulley 375 and a bevel gear 415, FIG. 2, attached to the underside of the pulley. This gear 415 meshes with another bevel pinion 416 which is mounted on a bushing 417 having a left portion extending through the end 435 of the arm 38 and there engages one-half of a bellows-type coupling 419, the left half of which is pinned to the gripper shaft 412 by a pin 900. This bellows coupling 419 has a high spring constant. It is used for the vibratory, search mode of operation of the gripper end, as described more fully hereinafter.

It is shown in FIG. 1 that the gripper shaft 412 is hollow and at its right end 421 is connected with a flexible thin hollow tube 420 which also enters into the vibratory search mode of operation of the gripper. This hollow tube 420 provides a fluid conduit into the gripper shaft 412 and through it into the cavity 422 in the housing 424. From cavity 422 another channel 423 carries the hydraulic pressure to a cavity 901 in the housing 424 for grip piston 408 to drive the wedge cam 409 to the left.

It is possible to rotate the gripper 45 by the angle $\theta$ from a normal horizontal position, i.e., 0° to any angle between 0° and 270°.

Also FIG. 1 shows the directions of motion during the search mode of operation by means of a pair of lines 46. Lines 46 show that the gripper may be vibrated in two orthogonal directions to search for a mating position of two engaged parts one of which is held by the gripper and another of which is in a work station.

Referring back to FIG. 1 such longitudinal and transverse movements are actuated by hydraulic pistons whose motions are coupled to the gripper shaft 412. At the right end of FIG. 1 it is seen that the flexible shaft 420 passes through and is attached to longitudinal piston 436 within a chamber 425 served by hydraulic lines 426 and 427. In the transverse direction, two hydraulic plungers 429 and 430 are shown pressing against opposite sides of the gripper shaft 412. The plungers 429 and 430 are held within chambers 431 and 432 and connected by hydraulic lines 433 and 434 through which they are alternately operated by a transverse oscillator described below.

THE SEARCH DEVICES

In order to facilitate the insertion of, for example, a fastener (screw, rivet or pin) into a part supported opposite the gripper assembly 45, the manipulator shaft 412, FIG. 3, is simultaneously oscillated longitudinally at one frequency and transversely at a different frequency, each with an amplitude of, for example, 0.031 inches. It is during the searching mode of operation that an article such as a bolt may be held in contact with a surface having a hole therein and vibrated to find coincidence with the hole. Since a manipulator to which the gripper is attached may be driven by a digital drive having as its smallest or minimum increment of displacement 0.031 inches, (unlike an analog drive), to locate parts more accurately the gripper has been adapted to scan or search for the desired position within the area 0.015 inches on all sides of a position automatically reached by the digital drive.

In FIG. 3 the dimensions of the actuators for providing such hydraulic vibratory movements are exaggerated. Also the actuators are shown in a schematic fashion to emphasize the characteristics of the search mode of operation. As the vibrated article encounters resistance as when it engaged a hole in a supported part, the additional loading of the transverse and longitudinal hydraulic drive shown in FIG. 3 will result in an increase of frequency with a corresponding reduction in amplitude. The transverse search drive involves the opposing pistons 429 and 430 alternately pushing against the opposite sides of the gripper shaft 412. The longitudinal search drive is applied by piston 436 to the end of the flexible tube 421 to oscillate the gripper shaft 412 along its longitudinal axis. Beneath the search drive pistons 429, 430, and 436 shown in FIG. 3 are the hydraulic lines for connection to the hydraulic oscillating means. The longitudinal oscillator is in the upper section and the transverse oscillator is in the lower section.

The search drive circuits comprise two hydraulic oscillators with their respective delay pistons used as the drive for the gripper when in the search mode of operation. Since the two oscillators are similar, only the X-oscillator will be described.

Assuming that the manipulator is stationary and that the gripper has been pressurized, by application of pressure through manifold 903, fluid under pressure will be applied at the line P from a control (not shown). With the positions of the spools of longitudinal oscillator valves 438 and 446 as shown, fluid under pressure will be directed to the ports 441 and 444. With the latch valve 438 and the longitudinal search piston 436 as shown in FIG. 3, the fluid pressure at the port 444 of latch valve 438 will affect the transfer of valve 446 to the left. This transfer causes fluid under pressure to appear at port 442. The area of the surface of the longitudinal search drive piston 436 exposed to hydraulic pressure as compared to its load mass is selected to require approximately half the fluid pressure, to displace it 0.030 inches, as compared with the pressure required to displace the piston 439 of the latch valve 438. When the search drive piston 436 reaches its maximum displacement the pressure in the channel 442 (which had been reduced by orifice 447 during motion of piston 436) will build up to almost maximum pressure. This is so because the flow through the orifice 447 to displace the latch valve 438 will, by then, have been reduced appreciably. Thus the pressure between latch piston 440 and latch valve 438 will become comparable to that on the right side of latch valve 438. Because the area of the right-hand end of latch valve 438 exposed to that pressure is large compared to the area of latch valve 438 confronting piston 440, the total force on latch valve 438 will be directed leftward and latch valve 438 will shift to the left. With the transfer of the latch valve 438, the latch piston 439 will be pressurized through the port 442 driving the latch valve 438 to the left. The fluid now under pressure in the port 443 because of the leftward shift of latch valve 438 will restore the valve 446 to the right in the position shown, causing fluid under pressure from manifold 903 to appear at channel 441, restoring the longitudinal search drive piston 436 to the lower position shown. Again, the sudden reduction of fluid flow through the orifice 448 will allow the pressure to build up on the latch piston 440 of latch valve 438 and to transfer latch valve 438 to the right into the position shown.

Should the fastener supported by the gripper mate with the hole in a stationary part before the search piston 436 completes its stroke, then the piston 436 will be stalled and transfer of the valve 438 will occur sooner, because pressure will build up on line 426 or 427 and at port 441 or 442.

From the foregoing it is apparent that the longitudinal drive search piston 436 will be vibrated (reciprocated rapidly) until a part finds a mating arrangement and the searching operation is terminated immediately, by reduction of the amplitude of vibration to a very slight motion.

It is also apparent that a similar style of operation is effected when the two transverse search drive pistons 429 and 430 are considered as a single unit to be controlled by ports 442Y and 441Y in much the same way as the single unit longitudinal piston 436. The sole difference between the oscillators is that orifice sizes 447Y and 448Y may be selected for particular rates of operation. Accordingly, the specific description of the longitudinal oscillator applies to the transverse oscillator.

While the invention has been particularly shown and described with reference to a preferred embodiment thereof, it will be understood by those skilled in the art that various changes in form and detail may be made therein without departing from the spirit and scope of the invention.

What I claim is:

1. An article handling device including a gripper and means for vibrating said gripper and means for providing vibratory forces at a higher frequency as a function of increased resistance to motion of said gripper.

2. An article handling device including a gripper and means for vibrating said gripper to drive an article gripped by said gripper across a surface area at random for inserting said article into a location adapted to receive said article in said surface area.

3. An article handling device including means for vibrating said article handling device to drive an article secured thereto across an area at random for inserting said article, said means for vibrating including a plurality of actuators for providing forces in a plurality of directions at different angles to one another.

4. Apparatus in accordance with claim 3 wherein said actuators are adapted to provide vibratory forces at higher frequency in response to increased resistance to said forces applied to vibrate said gripper.

5. Apparatus in accordance with claim 3 wherein each of said actuators includes an oscillator for reversing the direction of force of the corresponding one of said actuators periodically.

6. An article handling device including means for vibrating said article handling device to drive an article secured thereto across an area at random for inserting said article, said means for vibrating including a plurality of actuators for providing motion in a plurality of directions, a first actuator of said actuators comprises a reciprocable piston secured to a shaft for providing longitudinal motion of said article handling device, and a second actuator of said actuators comprises a reciprocable piston arrangement for providing transverse motion of said article handling device.

7. An article handling device including a removable gripper and means for providing forces for vibrating said gripper longitudinally and transversely, adapted to provide vibratory forces at higher frequencies as a function of increased resistance to motion.

8. An article handling device adapted for precisely positioning a first element relative to a predetermined position on a second element, where said predetermined position includes a discontinuity in a planar surface of said second element;
   means for positioning said first element near said predetermined position within a given dimensional tolerance,
   vibratory means for effecting oscillatory movement of said first element, the amplitude of said movement being substantially coextensive with said given dimensional tolerance, and
   means responsive to increased resistance to said oscillatory movement when said first element is moving from within said discontinuity to the boundary of said discontinuity for changing the frequency of said oscillatory movements.

9. An article handling device adapted for precisely positioning a first element relative to a predetermined position on a second element, where said predetermined position includes a discontinuity in a planar surface of said second element;
   means for positioning said first element near said predetermined position with a given dimensional tolerance,
   vibratory means for effecting oscillatory movement of said first element, the amplitude of said movement being substantially coextensive with said given dimensional tolerance, and
   means responsive to increased resistance to said oscillatory movement when said first element is moving from within said discontinuity to the boundary of said discontinuity for changing the frequency and amplitude of said oscillatory movements.

10. An article handling device adapted for precisely positioning a first element relative to a predetermined position on a second element, where said predetermined position contains a hole in a planar surface of said second element;
    means for positioning said first element near said predetermined position within a given dimensional tolerance,
    vibratory means for effecting oscillatory movement of said first element, the amplitude of said movement being substantially coextensive with said given dimensional tolerance, and
    means responsive to increased resistance to said oscillatory movement when said first element is moving from within said discontinuity to the boundary of said discontinuity for changing the frequency of said oscillatory movements.

11. An article handling device adapted for precisely positioning a first element relative to a predetermined position on a second element, where said predetermined position contains a hole in a planar surface of said second element;
    means for positioning said first element near said predetermined position within a given dimensional tolerance,
    vibratory means for effecting oscillatory movement of said first element, the amplitude of said movement being substantially coextensive with said given dimensional tolerance, and
    means responsive to increased resistance to said oscillatory movement when said first element is moving from within said discontinuity to the boundary of said discontinuity for changing the frequency and amplitude of said oscillatory movements.

12. An article handling device for positioning a mating portion of a first element relative to a mating portion of a second element for complementary mating of said first and second elements, said device including;
    gripper means for gripping said first element,
    means for positioning said mating portion of said first element approximately in alignment with said mating portion of said second element,
    means for effecting oscillatory movement of said first element at a given frequency and amplitude in a plane perpendicular to the direction of movement required for mating said first and second elements whereby the edges of said mating portions contact each other and create resistance to said movement; and
    means responsive to said increased of resistance to increase the frequency of said oscillatory movement.

13. An article handling device for positioning a mating portion of a first element relative to a mating portion of a second element for complementary mating of said first and second elements, said device including;
    gripper means for gripping said first element,
    means for positioning said mating portion of said first element approximately in alignment with said mating portion of said second element,
    means for effecting oscillatory movement of said first element at a given frequency and amplitude in a plane perpendicular to the direction of movement required for mating said first and second elements whereby the edges of said mating portions contact each other and create resistance to said movement; and
    means responsive to said increased of resistance to increase the frequency and to decrease the amplitude of said oscillatory movement.

14. An manipulatable device for positioning a mating portion of a first element relative to a mating portion of a second element comprising a hole for complementary mating of said first and second elements, said device including:
    gripper means for gripping said first element, means for positioning said mating portion of said first element approximately in alignment with said mating portion of said second element,
    means for effecting oscillatory movement of said first element at a given frequency and amplitude in a plane perpendicular to the direction of movement required for mating said first element in said hole whereby the edges of said mating portions contact each other and create resistance to said movement; and
    means responsive to said increase of resistance to increase the frequency of said oscillatory movement.

15. A manipulatable device for positioning a mating portion of a first element relative to a mating portion of a second element comprising a hole for complementary mating of said first and second elements, said device including:
    gripper means for gripping said first element,
    means for positioning said mating portion of said first element approximately in alignment with said mating portion of said second element,
    means for effecting oscillatory movement of said first element at a given frequency and amplitude in a plane perpendicular to the direction of movement required for mating said first element in said hole whereby the edges of said mating portions contact each other and create resistance to said movement; and
    means responsive to said increase of resistance to increase the frequency and to decrease the amplitude of said oscillatory movement.

16. An article handling device including a gripper and means for vibrating said gripper during continuous positive gripping of an article by said gripper to drive said article gripped by said gripper across and in contact with a surface at random for inserting said article into a location adapted to receive said article within said surface.

17. An article handling device including means for vibrating said article handling device to vibrate an article secured thereto to move said article across and in contact with a surface at random for inserting said article into a hole, said means for vibrating including a plurality of actuators for providing forces in a plurality of directions at different angles to one another.

18. An article handling device including means for vibrating said article handling device to vibrate an article secured thereto to move said article across and in contact with a surface at random for inserting said article into a hole, said means for vibrating including a plurality of actuators for providing forces in a plurality of directions at different angles to one another, said actuators being adapted to provide vibratory forces at higher frequency in response to increased resistance to said forces applied to vibrate said gripper.

19. An article handling device including means for vibrating said article handling device to drive an article secured thereto randomly across a surface with which it is in contact for the purpose of inserting said article in a hole in said surface, said means for vibrating including a plurality of actuators for providing motion in a plurality of directions, a first actuator of said actuators comprises a reciprocable piston secured to a shaft for providing longitudinal motion of said article handling device relative to said surface adjacent to said hole, and a second actuator of said actuators comprises a reciprocable piston arrangement for providing transverse motion of said article handling device relative to said surface adjacent to said hole.

20. An article handling device including a removable gripper and means for providing forces for vibrating said gripper longitudinally and transversely relative to a surface containing a hole adapted to provide vibratory forces at higher frequencies as a function of increased resistance to motion of an article held by said gripper, when contacting said hole.

21. An article handling device adapted for precisely positioning a pin in a hole at a predetermined position in a second element;
   means for positioning said pin at said predetermined position with a given dimensional tolerance,
   vibratory means for effecting oscillatory movement of said pin, the amplitude of said movement being coextensive with said given dimensional tolerance, and
   means responsive to increased resistance to said oscillatory movement when said pin is moving about said hole for changing the frequency and amplitude of said oscillatory movements.

22. An article handling device for positioning a mating portion of a pin relative to a mating hole in a second element for complementary mating of said pin and hole, said device including:
   gripper means for gripping said pin for positioning said mating portion of said pin approximately in alignment with said mating portion of said hole,
   means for effecting oscillatory movement of said pin at a given frequency and amplitude in a plane perpendicular to the direction of movement required for mating said pin and said hole whereby the edges of said mating portions contact each other and create resistance to said movement; and
   means responsive to said increase of resistance to increase the frequency and to decrease the amplitude of said oscillatory movement.

23. An article handing device adapted for precisely positioning a first element relative to a hole at a predetermined position on a second element, where said hole comprises a discontinuity in a surface of said second element,
   means for positioning said first element at said predetermined position within a given dimensional tolerance,
   vibratory means for effecting oscillatory movement of said first element, the amplitude of said movement being substantially coextensive with said given dimensional tolerance,
   and means responsive to increased resistance to said oscillatory movement when said first element is moving from within said circumscribed planar discontinuity to the boundary of said discontinuity for changing the frequency and amplitude of said oscillatory movements,
   said vibratory means including a plurality of actuators for providing motion in a plurality of directions, a first actuator of said actuators comprising a reciprocable piston secured to a shaft for providing longitudinal motion of said article handling device, and a second actuator of said actuators comprising a reciprocable piston arrangement for providing transverse motion of said article handling device.